United States Patent [19]

Akiyama

[11] Patent Number: 4,500,804

[45] Date of Patent: Feb. 19, 1985

[54] SMALL ELECTRIC MOTOR

[75] Inventor: Takeshi Akiyama, Matsudo, Japan

[73] Assignee: Mabuchi Motor Co., Ltd., Japan

[21] Appl. No.: 433,365

[22] Filed: Oct. 7, 1982

[30] Foreign Application Priority Data

Oct. 28, 1981 [JP] Japan ................ 56-160602[U]

[51] Int. Cl.³ .................................. H02K 13/06
[52] U.S. Cl. .................. 310/40 MM; 310/219; 310/239
[58] Field of Search .......... 310/228, 220, 40 MM, 310/239, 219

[56] References Cited

U.S. PATENT DOCUMENTS

| | | | |
|---|---|---|---|
| 1,771,609 | 7/1930 | Berger | 310/219 UX |
| 2,812,454 | 11/1957 | Buck | 310/40 MM |
| 3,234,420 | 2/1966 | Lindner | 310/40 MM |
| 4,322,650 | 3/1982 | Mabuchi | 310/220 |

*Primary Examiner*—Donovan F. Duggan
*Attorney, Agent, or Firm*—McGlew and Tuttle

[57] ABSTRACT

A small electric motor wherein brushes are disposed on the contact surface of a commutator having a lubricant coated thereon at a predetermined angle with respect to the direction normal to a rotor rotating shaft so that the brushes plow through the lubricant film over a wide area while making slide contact with the commutator, whereby the contact resistance of the brushes is stabilized.

5 Claims, 10 Drawing Figures

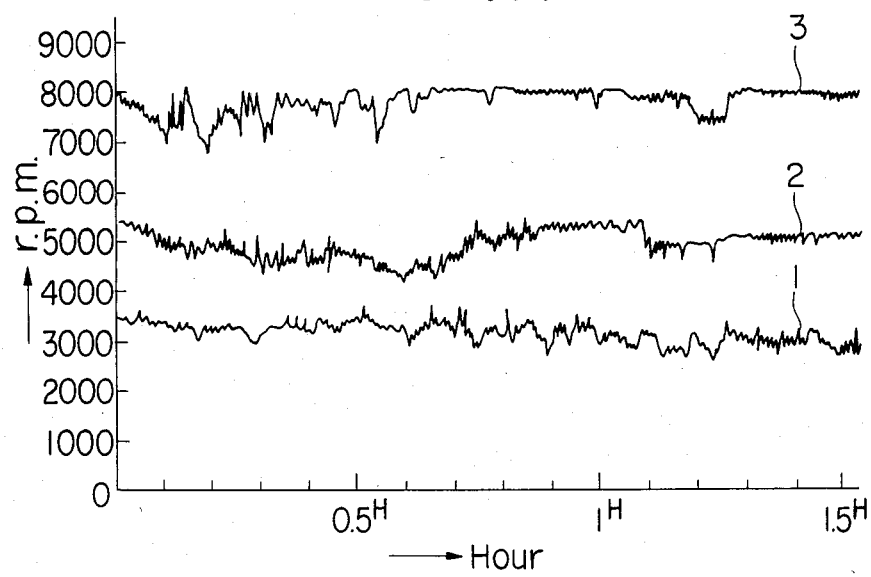
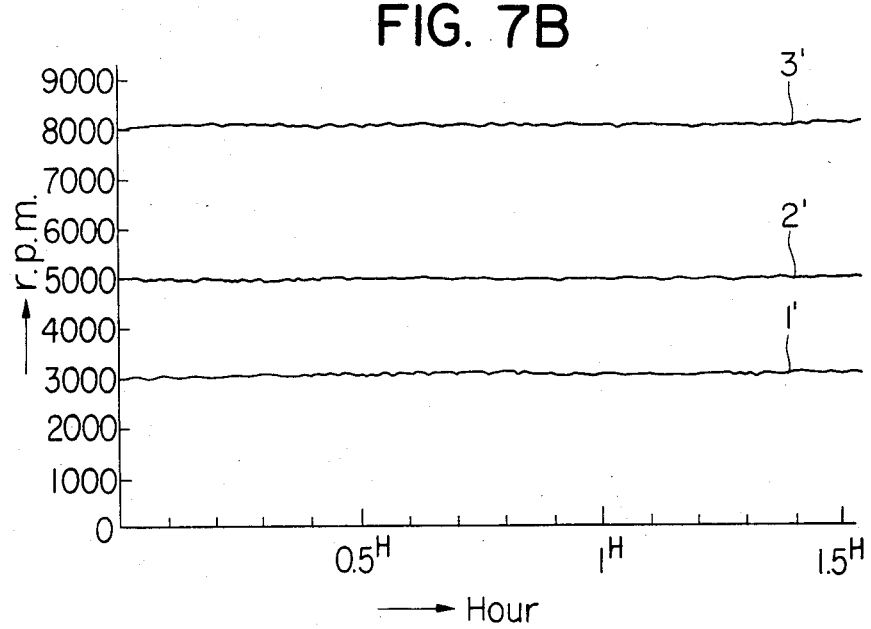

SMALL ELECTRIC MOTOR

BACKGROUND OF THE INVENTION

1. Field of the Invention

This invention relates generally to a small electric motor, and more specifically to a small electric motor wherein a lubricant is coated on the contact surface of a commutator fixedly fitted to a rotor rotating shaft.

2. Description of the Prior Art

In a small electric motor having metallic brushes for making contact with a commutator to feed drive current to a rotor, it is a common practice to apply a lubricant in the contact surface of the commutator to prevent mechanical and electrical wear due to unwanted vibration of the brushes.

In such an arrangement, a sharp edge is provided along the length of each of the brushes by bending the brush longitudinally into a V-shape in crosssection so that the sharp edge plows through the lubricant which is made of an electrically insulating material, causing the lubricant to form a thin film during the slide contact of the brush with the commutator surface.

This arrangement will be described in detail in the following, referring to the accompanying drawings.

In FIGS. 1 through 3 illustrating the conventional construction of this type of motor, reference numeral 1 refers to a large case; 2 to a permanent magnet; 3 to a rotor; 4 to a winding; 5 to a commutator; 6-1 and 6-2 to metallic brushes having slide contact portions 6-1A and 6-2A which form sharp edges by bending the brushes longitudinally into a V-shape in crossection; brush arms 6-1B and 6-2B and terminals 6-1C and 6-2C; 7 to a rotating shaft; 8-1 and 8-2 to bearings; 9 to a small case; 10 to a commutator segment more than one of which are disposed on the surface of the commutator 5 at equal spacings in the angular positional direction; and 11 to a lubricant, for example, grease, respectively.

In the large case 1, housed are the permanent magnet 2 and the rotor 3 on which the rotor winding 4 is wound. The commutator 5 is fixedly fitted to the rotating shaft 7 of the rotor 3. The metallic brushes 6-1 and 6-2 are disposed facing each other on the commutator 5, and make sliding contact with the commutator 5 at the sharp edges of the slide contact portions 6-1A and 6-2A thereof. Both ends of the rotating shaft 7 are rotatably supported by the large case 1 and the small case 9 which covers the open end of the large case 1, via the bearings 8-1 and 8-2. The lubricant 11 is applied on the portion of the commutator 5 at which the brushes 6-1 and 6-2 make sliding contact with the commutator 5.

Consequently, as the motor rotates, the sharp edges of the slide contact portions 6-1A and 6-2A plow through the lubricant 11 deposited on the commutator 5, making electrical contact with the commutator segment 10 through a thin film of the lubricant 11. In such a case, even the lubricant 11 of a non-conductive type, when formed into a thin film, becomes conductive, causing no problems in the electrical conductivity between the commutator segment 10 and the brushes 6-1 and 6-2. Furthermore, the lubricant 11 plowed away by the brushes 6-1 and 6-2 forms ridges on both sides of the sliding path of the brushes 6-1 and 6-2, exhibiting a good damping effect in preventing the brushes 6-1 and 6-2 from unwantedly jumping up from the commutator surface.

With this arrangement, no problem need arise so long as the opposing brushes 6-1 and 6-2 face each other at the same position in the axial direction. However, if the brushes 6-1 and 6-2 shift their relative position in the axial direction, as shown by dotted lines in FIG. 3, the grooves of the lubricant 11 produced by the brushes 6-1 and 6-2 are staggered in the axial direction, as shown by solid and dotted lines in the figure. This causes the brush 6-2 to form a groove by plowing through the ridge produced by the brush 6-1, or vice versa. As a result, the contact resistances of the brushes 6-1 and 6-2 with the commutator 5 vary every rotation of the motor, resulting in fluctuations in motor rotation.

Furthermore, this arrangement requires a sufficient brush pressure to cause the sharp edges of the brush slide contact portions 6-1A and 6-2A to plow through a layer of the lubricant 11.

SUMMARY OF THE INVENTION

It is an object of this invention to provide a small electric motor wherein brushes are disposed at a predetermined angle to the direction normal to the motor rotating shaft, whereby a lubricant layer coated on the surface of a commutator to improve continuity in the slide contact portions of the brushes.

It is another object of this invention to provide a small electric motor wherein the performance of the motor is improved by reducing variations in motor rotation as a result of improved continuity in the slide contact portions of the brushes.

BRIEF DESCRIPTION OF THE DRAWING

FIGS. 7A and 7B are graphs to compare variations in motor rotation between the motor having the conventional type of commutator on which a lubricant is caoted, and the motor of the third embodiment of this invention.

DETAILED DESCRIPTION OF THE INVENTION

Figure 1:
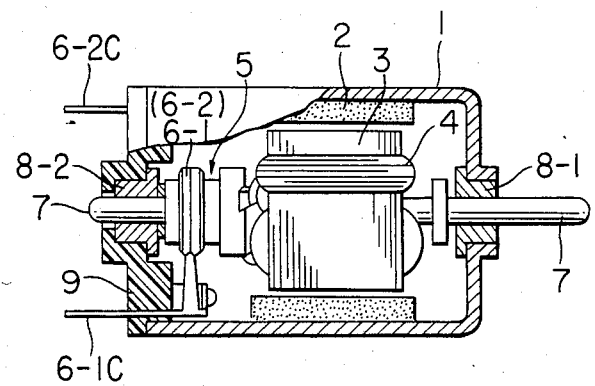
FIG. 1 is a longitudinal sectional view of a conventional small electric motor having a commutator on which a lubricant is coated with parts partially broken away.
Figures 2, 3:
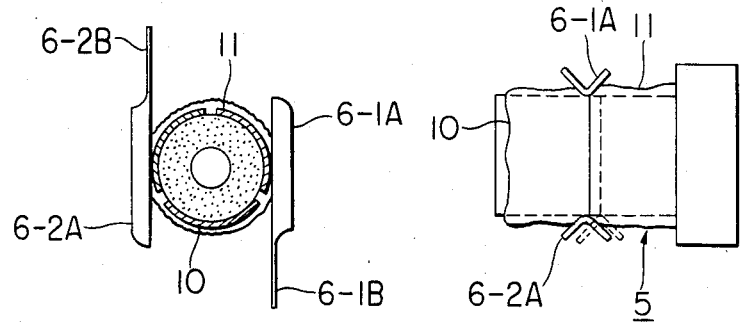
FIG. 2 is an enlarged crosssectional view of the commutator of the motor shown in FIG. 1.
FIG. 3 is an enlarged plan view of the commutator of the motor shown in FIG. 1.

This invention provides a small electric motor of the type described above, that is, a small electric motor having a commutator on the surface of which a lubricant is coated wherein brushes are disposed at a predetermined angle, $\theta$, to the direction normal to the motor rotating shaft.

In FIGS. 4A through 6 of assistance in explaining motor brushes embodying this invention, reference numeral 1 refers to a large case; 2 to a permanent magnet as a motor stator; 3 to a motor rotor; 4 to a winding; 5 to a commutator; 7 to a rotating shaft; 8-1 and 8-2 to bearings; 9 to a small case; 10 to a commutator, a plurality of which are disposed on the contact surface of the commutator 5 at equal spacings in the angular positional direction; 11 to a lubricant, grease, for example; 12-1 and 12-2 to a pair of single-piece metallic brushes in the first embodiment of this invention, comprising slide contact portions 12-1A and 12-2A having formed thereon sharp edges by bending longitudinally into a V-shape in crosssection, brush arms 12-1B and 12-2B, and terminals 12-1C and 12-2C, respectively.

Figure 4A:
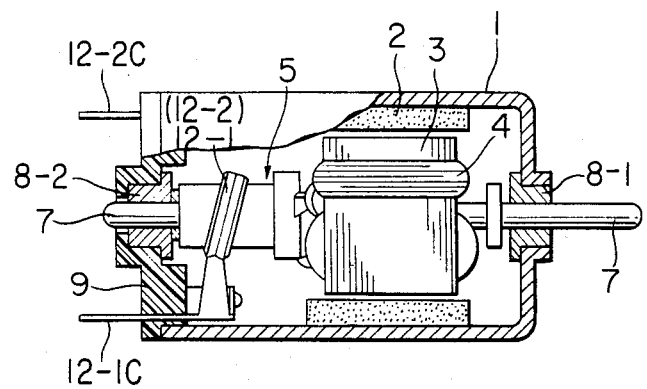
FIG. 4A is a longitudianl sectional view of a small electric motor embodying this invention, having a commutator on which a lubricant is coated, with parts partially broken away.
Figure 4B:
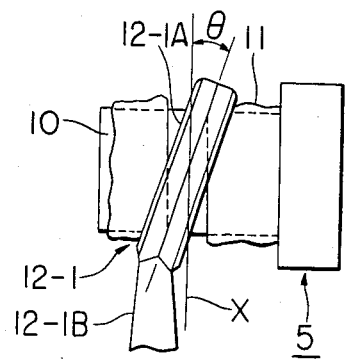
FIG. 4B is an enlarged side elevation of the commutator of the motor shown in FIG. 4A.

In FIGS. 4A and 4B, only one brush 12-1 and the terminal 12-2C of another brush 12-2 of pair of the brushes 12-1 and 12-2 are illustrated. Note that only one side of brush of a pair of brushes are illustrated in other embodiments, which will be described later.

In the large case 1, the permanent magnet 2 and the rotor 3 are housed. The rotor winding 4 is wound on the rotor 3. The commutator 5 is fixedly fitted to the rotating shaft 7 of the rotor 3. On the commutator 5, the metallic brushes 12-1 and 12-2 are disposed facing each other. The brushes 12-1 and 12-2 make slide contact with the commutator 5 at the sharp edges of the slide contact portions 12-1A and 12-2A. In this invention, any one or both of the slide contact portions 12-1A nd 12-2A are bent to a predetermined angle, $\theta$, with respect to the direction (X) normal to the motor rotating shaft 7. (FIG. 4B) Both ends of the rotating shaft 7 are rotatably supported at the centers of the large case 1 and the small case 9 covering an open end of the large case 1, via the bearings 8-1 and 8-2. The lubricant 11 is applied to the contact surface of the commutator 5 with which the brushes 12-1 and 12-2 make contact.

Figure 5:
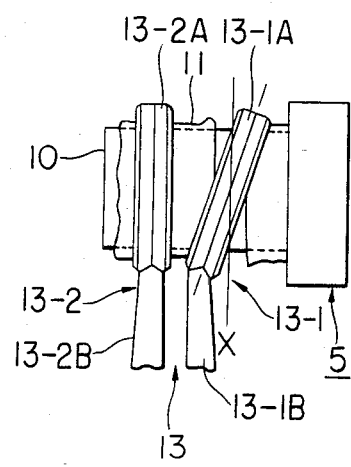
FIG. 5 is an enlarged side elevation of major components of the commutator of another embodiment of this invention.

In FIG. 5, numeral 13 denotes a fork-shaped brush in the second embodiment of this invention, having slide contact portions 13-1A and 13-2A and brush arms 13-1B and 13-2B at the bifurcated portions thereof, one of the slide contact portions 13-1A being bent to a predetermined angle, $\theta$, with respect to the direction (X) normal to the rotating shaft 7.

Figure 6:
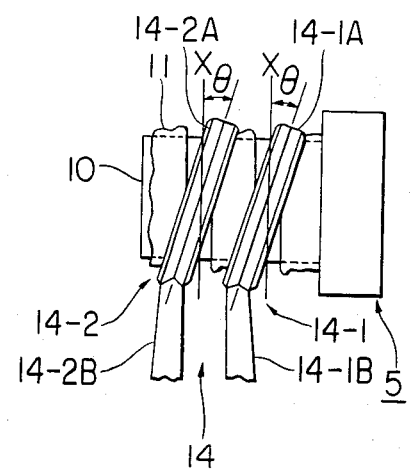
FIG. 6 is an enlarged side elevation of major components of the commutator of still a further embodiment of this invention.

In FIG. 6, numeral 14 denotes a fork-shaped brush in the third embodiment of this invention, having two slide contact portions 14-1A and 14-2B, which are bent to a predetermined angle, $\theta$, with respect to the direction (X) normal to the rotating shaft, and brush arms 14-1B and 14-2B.

In the first embodiment of this invention, shown in FIGS. 4A and 4B, where the slide contact portion 12-1A of the singlepiece brush 12-1 is bent to a predetermined angle, $\theta$, with respect to the direction (X) normal to the rotating shaft, the sharp edge of the slide contact portion 12-1A of the brush 12-1 makes contact with the commutator 5 as the motor rotates, plowing through the lubricant layer 11 on the commutator surface to form a groove. As shown by solid lines in FIG. 4B, this groove is relatively wider, compared with that formed by the conventional type of brush, because the slide contact portion 12-1A is tilted axially at a predetermined angle. Consequently, even when the brush 12-2 (not shown) facing the brush 12-1 is slightly shifted sideways, the groove formed by the brush 12-2 substantially agrees with that formed by the brush 12-1. This allows the brushes 12-1 and 12-2 to make contact with the commutator 5 within the same groove, reducing variations in contact resistance, leading to stabilized motor rotation.

Similarly, in the second and third embodiments of this invention, shown in FIGS. 5 and 6, variations in contact resistance can be reduced to stabilize motor rotation by tilting any one (13-1A in FIG. 5) or both (14-1A and 14-2A in FIG. 6) of the slide contact portions at a predetermined angle in the axial direction.

The above description of the first through third embodiments is concerned with the brush where only the slide contact portion thereof is bent. However, the brush may be of such a cnstruction that both the slide contact portion and the brush arm are tilted together, or the slide contact portion is tilted in the opposite direction (leftward in the figures).

Next, variations in motor rotation in the conventional type of brush and the brush of this invention will be compared.

FIG. 7A is a graph illustrating variations in motor rotation when a motor having the conventional type of fork-shaped brush was operated for 1.5 hours at (1) 3,000 rpm, (2) 5,000 rpm and (3) 8,000 rpm, respectively.

FIG. 7B is a graph illustrating variations in motor rotation when a motor of the third embodiment of this invention, with the brush slide contact portions tilted at 20° was operated for 1.5 hours at (1') 3,000 rpm, (2') 5,000 rpm and (3') 8,000 rpm, respectively. In both figures, the ordinate represents motor revolution (rpm) and the abscissa represents time.

Both graphs reveal that, the motor having the conventional type of brush shows the maximum variations in rotation of approx. 1,200 rpm when operated at speed (1), approx. 1,300 rpm at (2), and approx. 1,500 rpm at (3), while the motor of this invention invariably shows the maximum variations in rotation as low as approx. 500 rpm when operated at speed (1'), (2') or (3').

Figure 8:
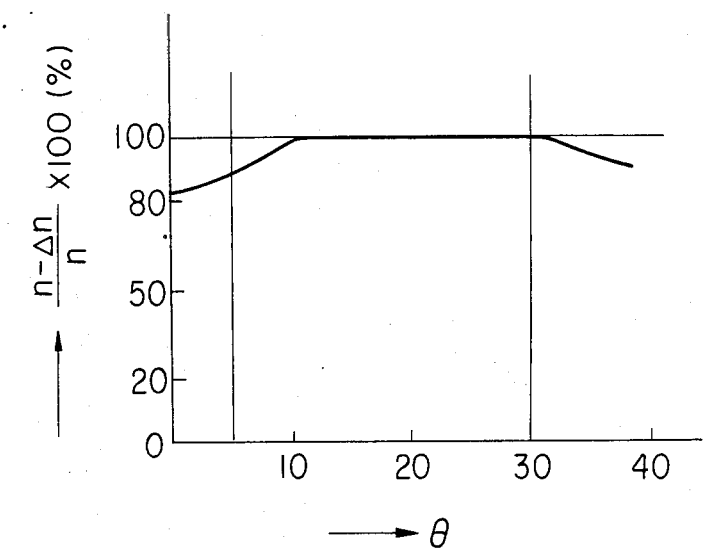
FIG. 8 is a diagram of a motor performance stability curve illustrating the relationship between the stability of motor rotation and the tilting angle, $\theta$, of the brush.

Next, the relationship between the tilting angle, $\theta$, of the brush and performance stability with respect to variations in motor rotation will be described, referring to FIG. 8. The performance stability used here is defined as $$\left(\begin{array}{c}\text{Performance}\\\text{stability}\end{array}\right) = \frac{\left(\begin{array}{c}\text{Specified}\\\text{revolution }(n)\end{array}\right) - \left(\begin{array}{c}\text{Variation in}\\\text{specified revolution }(\Delta n)\end{array}\right)}{(\text{Specified revolution }(n))}$$

The performance stability curve was prepared by experimentally obtaining the revolution of a motor at varied tilting angle, $\theta$, of the brush thereof.

The results indicate that the performance stability of a motor sharply increases in the vicinity of $\theta = 5°$, reaches substantially saturation in the neighborhood of 15°, remains saturated up to about 30°, and then sharply drops beyond 30°.

As described above, this invention makes it possible to virtually eliminate variations in motor rotation, stabilizing motor performance because the sharp edges of brush slide contact portions plow through the lubricant layer on the commutator surface, forming a groove wide enough to allow the brushes to make contact with the commutator surface even when the opposing brushes shift sideways.

What is claimed is:

1. A small electric motor having a permanent magnet, a rotor having a shaft, a commutator fixedly fitted to the rotor shaft and having a lubricant coated on a contact surface thereof, and brushes for making sliding contact with said commutator, characterized in that said brushes are disposed at a predetermined angle of from 5° to 30° with respect to the direction normal to said shaft, each of said brushes comprising a single-piece slide contact portion and a brush arm; said slide contact portion being bent to said predetermined angle with respect to the direction normal to said shaft and having a V-shaped cross-section.

2. A small electric motor as set forth in claim 1 wherein each of said brushes comprises a plurality of fork-shaped slide contact portions and brush arms; at least one of said slide contact portions being bent to said predetermined angle with respect to the direction normal to said shaft.

3. A small electric motor as set forth in claim 2 wherein all off said slide contact portions are bent to said predetermined angle with respect to the direction normal to said shaft.

4. A small electric motor as set forth in claim 1 wherein said predetermined angle is within a range of approximately 15° to 30°.

5. A small electric motor comprising:
a housing,
a permanent magnet in said housing;
a rotor having a rotor shaft rotatably mounted in said housing adjacent said permanent magnet;
a cylindrical commutator fixed to said rotor shaft for rotation therewith, said commutator having an outer cylindrical sliding contact surface extending at least partly around said commutator;
a lubricant coating on said sliding contact surface of said commutator; and
a plurality of brushes fixed to said housing and having elongated slide surfaces in contact with said sliding contact surface of said commutator, each elongated slide surface extending at an angle ($\theta$) to a direction which is normal to a longitudinal axis of said rotor shaft, said angle being an acute angle between 5° and 30° C., a portion of each brush which carries each elongated slide surface having a V-shaped cross-section.

* * * * *